WAITE & SENOR.
Coffee Pot.
No. 836.
Reissued Oct. 18, 1859.
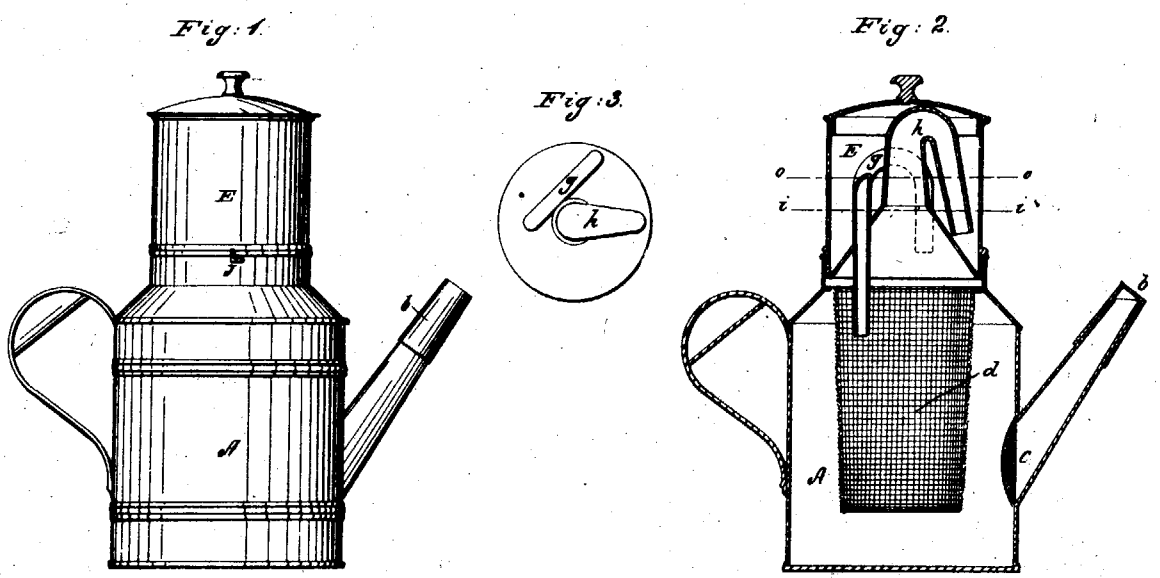

UNITED STATES PATENT OFFICE.

CHARLES B. WAITE AND JOSEPH W. SENER, OF FREDERICKSBURG, VIRGINIA.

IMPROVEMENT IN COFFEE-POTS.

Specification forming part of Letters Patent No. 14,748, dated April 22, 1856; Reissue No. 583, dated August 10, 1858; Reissue No. 836, dated October 18, 1859.

*To all whom it may concern:*

Be it known that we, CHARLES B. WAITE and JOSEPH W. SENER, both of Fredericksburg, in Spottsylvania county, and State of Virginia, have invented certain new and useful Improvements in Coffee-Pots and other Cooking-Boilers; and we do hereby declare that the following is a full, clear, and exact description thereof, reference being had to the accompanying drawings and the letters of reference marked thereon, forming part of this specification, and in which—

Figure 1 represents the exterior of the coffee pot or boiler. Fig. 2 is a sectional view taken through the spout and handle of the same, and Fig. 3 is a plan of the interior of the condenser.

The same letters of reference occurring in the several figures denote corresponding parts.

Our invention consists in a novel and effective arrangement of the condensing apparatus of a boiler for preserving the fine aroma (of coffee, tea, or other articles of food, or herbs, roots, &c., used for medicinal purposes and the like, the extract of which is obtained by boiling) which escapes with the steam when boiled in an open or common-boiler. For this purpose a variety of condensing-boilers have been devised and patented, all of which have been found to possess some objectionable feature, either in the difficulty of cleaning, the danger of explosion, or the expense of construction, all of which we claim to have overcome by the production of a self-operating condensing-boiler, every part of which is easily cleaned, of simple and cheap construction, and perfectly safe.

After a careful examination of all the condensing coffee-pots anterior in date to ours, we think we may safely say that none of them have combined the features and advantages that are united in our invention. They have either required the upper vessel or condenser to be taken off in order to return its contents to the boiler, or they have employed some other means of discharging the contents of the condenser into the boiler, which required the intervention of an attendant, or they have not mingled the water of condensation with the cold water in the condenser at all, but returned the former direct to the boiler by means of the same tube in which it was condensed.

The pot of A. Bencini is the only one previous to ours that impregnates the water in the condenser with the aroma of the coffee in the upper vessel; but that pot has no self-acting mode of delivering the water of the upper chamber into the body of the pot below. The stopper for that purpose has to be unscrewed by hand.

Our condensing-pot we believe to be the first to present a combination of the following features, first, condensation of steam charged with aroma in the upper vessel by injection into the water of the condenser and not by simple contact with a cold surface; second, impregnation of the water in the condenser with the aroma of the coffee or other substance under treatment; third, self-operating discharge of the condensed aroma and the contents of the condenser into the body of the pot; fourth, closure of the vessel during the operation.

To enable others to make and use our invention, we will describe its construction and operation by referring to the drawings, in which—

A represents the boiler, which may be made of any ordinary form, constructed with the opening at the top somewhat contracted, but yet sufficiently large to pass the hand through for the purpose of cleaning. On the end of the spout is a cap or stopper, *b*, to prevent the escape of steam therefrom while boiling. A perforated plate or strainer, *c*, covers the opening of the spout inside the boiler. A cylindrical or cup formed strainer, *d*, may also be used inside the boiler to contain the coffee or other article to be boiled, if thought desirable. A cylindrical or other shaped chamber, E, is made to fit on the top of the boiler, and is secured thereto by lugs *f*, which tighten in the manner of a bayonet joint, or by a screw or other suitable device. This chamber E, which we shall hereinafter call the "condenser," is formed with a conical or convex bottom, from the apex of which rises a tapering tube, which is bent over and extends downward very nearly to the bottom of the condenser. Another siphon-formed tube, *g*, is inserted in the condenser, the shorter leg of which is placed as near the bottom thereof as convenient to draw off its contents, the longer leg passing through the conical bottom of the condenser into the boiler. On the top of the condenser is a cover made to fit either the condenser or the boiler when the former is removed.

There are two ways of using this boiler, both of which we will now describe.

First. The required quantity of water is put into the boiler, and the coffee or other ingredient to be boiled with it, or if the strainer *d* be used it is measured into it and inserted in the boiler, the spout being then stopped with the cap *b* and the condenser put onto the boiler with a small quantity of water in it, sufficient to cover the end of the steam-pipe *h* about to the level indicated by the red line *i*, when it is placed on the fire and made to boil as long as desired. The steam arising from the boiler passes over through the tube *h* into the water in the condenser, which absorbs all the aroma. When boiled sufficiently, a little cold water is poured onto the siphon and steam-pipe, which condenses the steam in the boiler, causing a vacuum, when the siphon *g* is instantly charged and draws off the entire contents of the condenser into the boiler, which suddenly checks its boiling and causes it to settle down perfectly clear, ready for use.

The second mode is by putting the coffee or other ingredient and water into the boiler, as in the first case, and then filling the condenser with water to a little below the bend of the siphon—say about the red line *o*. It is then made to boil rapidly, as before, until the steam passes over into the condenser, raises the water therein to the level of the bend of the siphon, when it becomes charged and immediately drains the condenser into the boiler, when the decoction is ready for use, as in the former mode. In this mode the time of boiling is regulated by the quantity of water first put into the condenser. If filled nearly to the bend of the siphon, it will take but a short time to raise it by the condensed steam high enough to charge the siphon. If but a small quantity be put in, it will take much longer. A little observation will show the user the best quantity to obtain the greatest amount of extract from a given quantity of material. Some articles require more boiling than others. Therefore, it is not deemed desirable to lay down any fixed rule. Suffice it to say that by varying the quantity of water put into the condenser the operation may be completed in from two to thirty minutes.

During the time of boiling the smell of the ingredients is not perceptible as in the use of the common or open boiler, thus proving that all the aroma which flies off with the steam when using the common boiler is retained in the condenser and eventually returned to the boiler. It will also be evident that as the steam at all times has a free escape into the condensing water instead of depending upon condensing-surfaces surrounded by water, as in other condensing-boilers, which must shortly become so much heated as to lose their condensing properties, there is very slight danger of explosion, and as nothing but steam and water pass through the tubes they will not become foul, while all the other parts of the apparatus are perfectly accessible for cleaning.

Having thus fully described our invention, what we claim is—

The employment, in a condensing-boiler in which the water in the condenser is impregnated with the aroma in the coffee or other article under treatment, of a siphon or equivalent self-acting device for the discharge of the contents of the condenser into the body of the boiler, substantially as described.

The above specification signed and witnessed this 23d day of September, 1859.

CHARLES B. WAITE.
JOSEPH M. SENER.

Witnesses:
GEO. F. CHEW,
H. P. CHEW.